No. 811,068. PATENTED JAN. 30, 1906.
G. E. KELLY.
COUPLING APPARATUS FOR CARS.
APPLICATION FILED JULY 19, 1904.
3 SHEETS—SHEET 1.
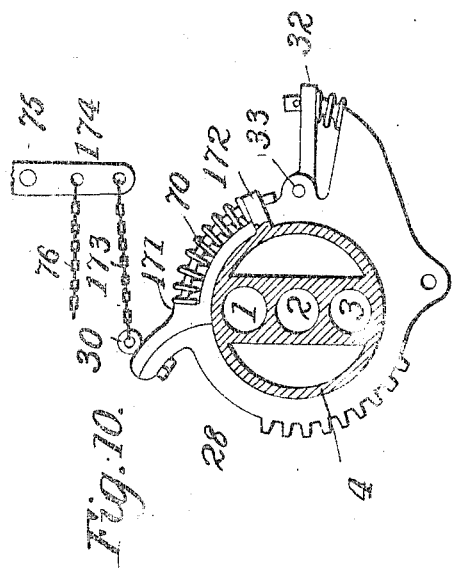
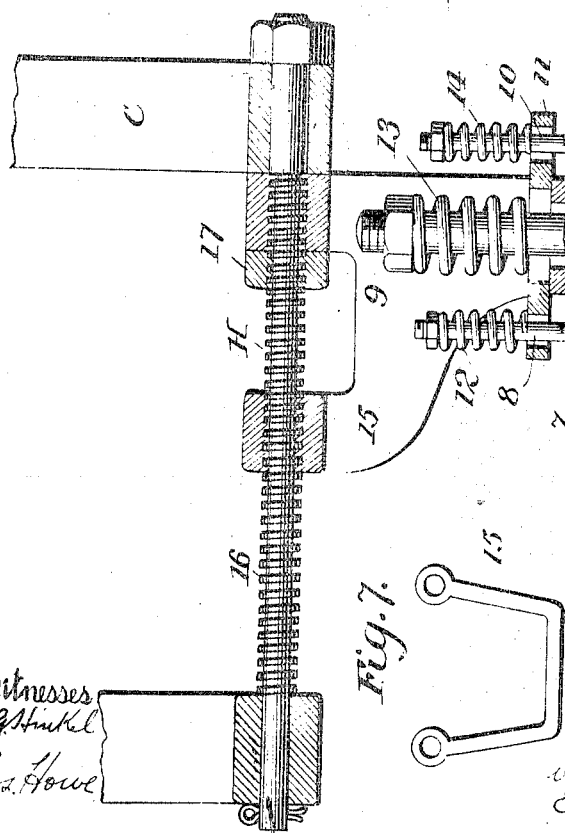

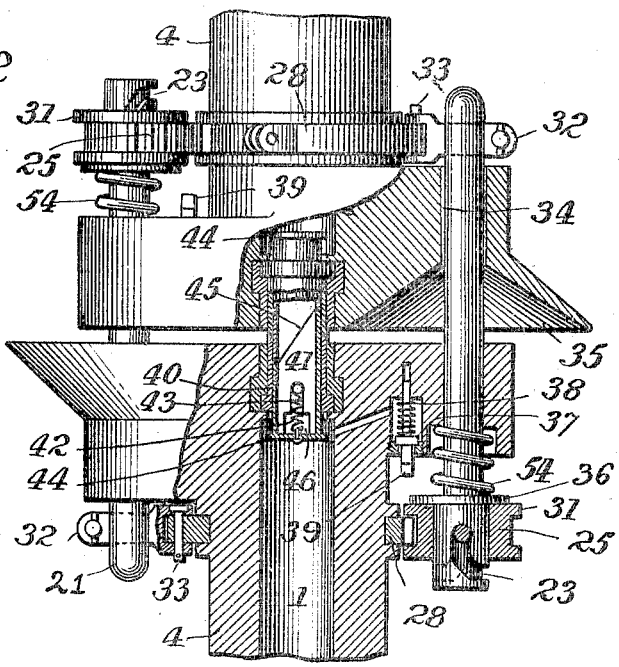
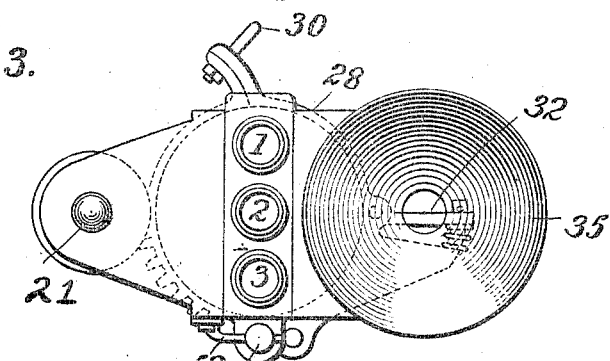
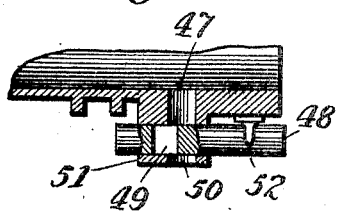
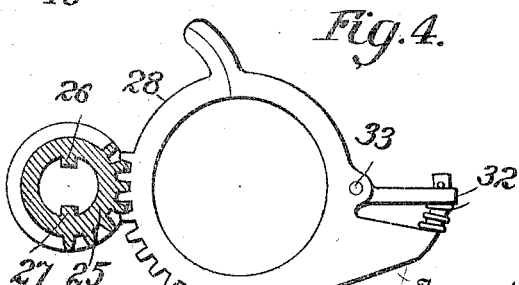

No. 811,068. PATENTED JAN. 30, 1906.
G. E. KELLY.
COUPLING APPARATUS FOR CARS.
APPLICATION FILED JULY 19, 1904.

3 SHEETS—SHEET 3.

UNITED STATES PATENT OFFICE.

GEORGE E. KELLY, OF DORRANCETON, PENNSYLVANIA, ASSIGNOR OF ONE-HALF TO JAELL M. ARNOLD, OF WILKESBARRE, PENNSYLVANIA.

COUPLING APPARATUS FOR CARS.

No. 811,068.	Specification of Letters Patent.	Patented Jan. 30, 1906.

Application filed July 19, 1904. Serial No. 217,213.

*To all whom it may concern:*

Be it known that I, GEORGE E. KELLY, a citizen of the United States, and a resident of Dorranceton, county of Luzerne, State of Pennsylvania, have invented certain new and useful Improvements in Coupling Apparatus for Cars, of which the following is a specification.

This invention relates to couplers between cars, which are employed for connecting conduits upon the cars so that a continuous duct or ducts is or are provided for the passage of air, steam, or other fluid, or any of them. Such couplers are ordinarily known as "hose-couplers."

It is one object of the invention to provide apparatus whereby brakes are automatically applied whenever the train accidentally parts; but it is desirable that the application of the brakes shall occur only when the parting is accidental and not when the train is intentionally parted. It will be obvious that the latter would be extremely inconvenient, as in switching, making up trains, and other cases.

It is a further object of the invention to provide an improved hose-coupler as will be hereinafter set forth.

In the accompanying drawings, which illustrate the invention in what is considered its best embodiment, Figure 1 is a side view, partially in section, of a coupler-section and a portion of another coupler-section connected thereto. Fig. 2 is a plan view, partly in section, of two connected coupler-sections. Fig. 3 is a view of the outer end of a coupler-section. Fig. 4 is a detail of gearing. Fig. 5 is a section of the steam-drip. Fig. 6 is a side view of the ends of two cars equipped with a draft-coupler and the improved hose-coupler. Fig. 7 is a front view, on a reduced scale, of the supporting-bracket of a coupler-section. Fig. 8 is a front view of a series of pipe lengths, partly broken away, for joining a coupler-duct with a train-pipe. Fig. 9 is a section on line 9 9 of Fig. 1. Fig. 10 is an end view showing a modified form of coupler-operating means, the body being shown in section.

Referring to the drawings, each hose-coupler comprises two identical sections A and B, connected to different cars. One coupler-section is attached to each end of a car, as C or D, and the sections are arranged so that they will always be properly presented to each other for coupling. Between the cars is also placed a draft-coupler E, and, in order that the hose-coupler may be disconnected whenever the draft-coupler is, a common means F for disconnecting the couplings is provided. The cars are fitted with suitable brakes which are automatically applied whenever the cars part unless the hose-coupler has been disconnected. The sections A and B are identical in construction and are secured in the same manner to their respective cars. Therefore a description of one applies to the other. Each is flexibly supported so that it may readily adjust itself to varying positions of the car by which it is carried, and flexible connections from the coupler-ducts to pipes fixed to the car are provided. Means H is also provided, whereby the section may be adjusted longitudinally of the car.

In the present instance the coupler is intended to form a connection for air-pipes for operating the brakes, similar pipes for operating the whistle, and steam-pipes for heating or other purposes. Each coupler-section therefore has three ducts 1, 2, and 3. Ducts 1 and 2 for air are shown as the top ones. The steam-duct 3 is preferably on the bottom, so that the drip will fall directly to earth and not flow down over the coupler-section, as would be the case if it were not so placed.

Each of the sections A and B comprises a body portion 4, inclosing the conduits 1, 2, and 3, slidably supported in a stirrup 5 and pressed outwardly by a spring 6, a nut 7 on the body 4 engaging with the stirrup to limit the outward movement. The stirrup is supported at a plurality of longitudinally-displaced points by rods 8, 9, and 10, which extend through holes in a washer 11 and are supported by springs 12, 13, and 14, which at their upper ends bear against nuts upon the upper ends of the rods and at their lower ends bear upon the washer 11. The washer extends longitudinally across and is supported by a transversely-extending U-shaped bracket 15, the front and rear stirrup-rods passing through holes on the overhanging ends of the washer 11, while the central rod passes through both the bracket and washer. The holes in the bracket and washer are elongated longitudinally to permit play of the stirrup-rods. The bracket 15 is supported at each of its ends by a screw 16, rotatably supported by the car-frame and engaging with threads tapped in the end of the bracket. By turning the screws in its ends the bracket, and therefore the coupler-section, may be longitudinally adjusted, and each end may be locked in position by a jam-nut 17. Pipes 18, 19, and 20, properly jointed to others to permit universal movement, connect the ducts 1, 2, and 3 at their inner ends with train-pipes, as 61. But one train-pipe and connections are shown, as each of the other train-pipes and its connections to its appropriate duct are of the same construction as that shown. I have discovered, however, that a certain arrangement of pipes, as will now be described, is peculiarly efficient in this application. Each of the ducts in each of the coupler-sections is connected to a train-pipe 61 by means of a series of jointed pipe lengths extending transversely of the car and of a combined length greater than the distance between the duct end and the train-pipe. Certain of the joints permit movement in one plane, while others permit movement in a plane ninety degrees removed from the first. In the apparatus shown each series of pipe lengths comprises the lengths 62, 63, and 64. The length 62 is jointed at one end to a train-pipe 61, so that it may swing in a vertical plane and at its other end is similarly jointed to the length 63. The other end of length 63 is similarly jointed to the length 64, which is jointed to the length 18, so that it may swing horizontally. The length 18 is an extension of a duct. The joints between the pipe lengths are in frequent movement as the coupler adjusts itself to the varying relative positions of the cars. It is therefore necessary that the joints shall be such as will withstand wear and will be tight, without causing undue friction and consequent stiffness in action. A joint which is of great value in this connection may be described as follows: In a casing 64, which may be a separate piece or formed integral with the pipe, is a recess 67, adapted to receive the end of a pipe 68, carrying a flange 69. Within the recess and surrounding the passage 70 in the casing is a boss 71, which telescopes within the end of the pipe 69. A seat or bearing 72 for the end of the pipe is provided by pouring lead, babbitt, or other suitable bearing material into the recess between the outside wall of the casing and the boss 71. The end of the pipe 68 is held in position by means of the gland 73, which is in threaded engagement with the casing and is adapted to bear against the outer side of the flange 69. The gland may be locked by means of a lock-nut 74.

The body 4 carries near its outer end a pin 21, which is rotatably and slidably mounted. The pin 21 near its outward end has a transverse notch 22 upon one side and near its inner end has cam-slots 23. Each of the cam-slots has an inclined portion and a circumferential portion, the latter being located at the inner end of the slot. A cog-wheel 25 is so mounted on the pin 21 near its inner end that it may turn thereon and has internal projections 26 and 27 extending into the cam-slots, so that longitudinal relative movement of the pin and cog-wheel causes them to turn with relation to each other. The cog 25 engages with a gear 28, mounted upon the body 4 so that it may turn, but is held against longitudinal movement. Means for turning the gear 28, such as a link 29, may be connected to the gear by any suitable means, as an eye 30. The cog 25 is held against longitudinal movement by means of rims 31 upon each side of the teeth of the cog, which bear against the sides of the teeth of the gear 28. Upon the opposite side of the gear 28 from the cog 25 is a spring-pressed latch 32, pivoted to the cog at 33. The latch 32 is located at the inner end of a channel 34 in the body 4, which channel at its outer end expands into a funnel 35, which is adapted to guide the end of the pin from the other section of the coupler into the channel 34, so that when the sections have come together the latch 32 will snap into the transverse notch in the pin. The pin 21 is spring-pressed inwardly by a spring 54, so that a disk 36, fixed to the pin, is normally pressed against the cog 25.

A valve 37, normally pressed against its seat by a spring 38, controls the connection of the duct 1 with the atmosphere. A draft on the pin 21 will cause it to move forward and the disk 36 to come against the stem 39 of the valve and remove the valve from its seat, thereby connecting the duct 1 with the atmosphere and causing the brakes to be applied. Apparatus whereby the release of air causes the brakes to be applied is well known, and therefore has not been illustrated in detail. It will be understood that the invention is not, however, limited to air-brakes or those of any particular class. At the outer end of each of the ducts is a valve for closing the duct upon parting of the cars. Each of the valves comprises a wedge-casing 40, preferably of pressed carbon, within which is slidably mounted the hollow piston 41, also preferably of pressed carbon. The piston is normally pressed outwardly by a spring 42, secured to the piston, and a pin fixed in the casing 40 and extending through a slot 43 in the piston-wall. The outward movement of the piston is limited by a shoulder 44 on the piston coming against the end of the casing 40. The outward end of the piston normally projects beyond the casing and has a diagonal face 45 to insure a good joint between it and the corresponding valve-piston of the other section. When the sections are in connected position, the piston of each section is forced inwardly, and the hole 46 in the piston forms a means of communication between the duct and the interior of the piston, which through the interior of the corresponding piston of the other section communicates in a similar manner with the duct of the other section. Thus the corresponding ducts of the two sections are connected together whenever the coupling is connected. When, however, the train parts, the pistons are drawn into their casings and the ends of the ducts closed.

Controlling a drip-vent 47 in the steam-duct is a piston-valve having a piston 48 with a passage 49, adapted to be moved into and out of registry with the vent 47 and a hole 50 in the valve-cylinder 51. The piston is normally held in such position by a spring 52 that the drip is closed. To the gear 28 is secured a spring 53, adapted to engage with the piston 48, when it is in position to disconnect the coupler and force the drip open. The sections are normally held in connected position by a spring 60, and if it be desired to "blow off" the steam-pipe at any time it may be done by throwing a section into disconnected position. The ends of the valve-pistons are elongated, so that those of adjacent sections abut against each other, and the closing of the valves is positively secured no matter under what circumstances the sections of a coupler are brought together.

The means F for operating the couplers may be of any suitable form, as a lever 57, pivoted to the car. The coupler-section is normally held in connected position by a suitable means, as a spring 60, connected to the lever 57.

The operation of the device may be described as follows: Assuming that two cars to be coupled are approaching each other, as the sections of the couplers come together the projecting ends of the hollow pistons of the duct-valves will engage and be pushed inwardly, thereby connecting the corresponding ducts on the two cars, as hereinbefore described. The coupler-sections are guided in their approach by the pins 21, which enter the mouths of the funnels 35 even though the sections are far out of alinement. The flexible mountings of the sections permit them to adjust themselves to the different conditions. After traversing the channels 34 the ends of the pins 21 emerge from the inner ends of those channels and passing over the latches 32 press them downwardly until the transverse notches in the pins are over the latches. The latches will then snap into the notches, and the sections thus be made fast to each other. The draft-coupling will also become connected in a well-known manner. If now it be desired to disconnect two cars, the free end of the operating-lever of the means F is depressed against the spring 60. This operates to disconnect the draft-coupler and to turn the gear 28, thereby throwing the latch 32, connected to the gear, out of the notch 22 of the pin from the other coupler-section. The motion of the gear 28 being transmitted through the cog 25 to the pin 21 of the section, that pin will be turned on its axis until its notch clears the latch of the other section. The coupler may then be parted, when the ducts will be automatically closed, as before described. It will thus be seen that a disconnection of the coupler can be effected by the manipulation of one section, and this without affecting the brakes in any way. If, however, the draft-connection of the cars becomes accidentally disconnected, so that one car leaves the other, a draft is created on the pins 21, which are drawn outwardly against the springs 54, and the disks 36 come against the stems 39 of the valves 37, unseating the valves and applying the brakes as before described. It will be obvious that as the hose-coupler is entirely inadequate for traction purposes the pins 21 must be disconnected as the two parts of the train separate; otherwise they would be broken. This disconnection is effected by means of the cam-slots 23 and the interior projections 26 and 27 from the cog 25. As the pins are drawn outwardly they are turned out of engagement with the latches 32 by the engagement of the inclined portions of the cam-slots with the projections. After traversing the inclined portion of the slots the projections 26 and 27 will enter the circumferential portions, so that the returning of the pins by the springs 54 and consequent release of the brakes as soon as the pins and latches have been disengaged will be prevented.

An important feature of the present invention is that by it, upon the separation of a train provided with brake-couplings of the character described, the brakes on the rear section will be applied and said section brought to rest before the forward section or car comes to a stop, and it will be impossible for the two sections to collide—that is, as soon as the valve 37 of the car immediately in rear of the point of separation is opened by contact of the head of the pin 21 therewith the pressure in the duct controlled by said valve will be so reduced that the brakes on the rear section will be instantly applied. The valve 37 of the car immediately in front of the break or point of separation will also be opened at the same time as the corresponding valve in the rear thereof; but the brakes on the forward section will not be applied as quickly as those on the rear section, because the action of the engine-pump will for a time supply pressure sufficient to hold said brakes of the forward section in an inactive position. This pressure of the engine-pump will of course be gradually overcome and the brakes applied to the forward section; but before the brakes are applied on said forward section the latter will have moved some distance from the rear section on which, as above described, the brakes have been instantly applied, and it will therefore be impossible for said rear section to collide with the forward car or section.

It will be noticed that when the coupling between two cars is intentionally separated the valves 37 will not be affected.

Instead of employing springs 60 springs 70 (see Fig. 10) may be employed. Each of the springs 70 bears at one end against a shoulder 71 on the cog 28 and at the other end against a shoulder 172 on the body 4. The manipulation of the hose-coupler may be effected by means of a chain 173 connecting the cog 28 with the lever 174, pivoted to the car at 75. The draft-coupler may also be connected with the lever by a chain 76.

Without being limited to the precise construction shown and described, what I claim is—

1. The combination with a car, of braking means mounted thereon, a second car, and a hose-coupling between said cars adapted to be connected and disconnected, and including means whereby the braking means is operated upon the parting of said cars when said coupling has not been disconnected, said brake-controlling means of the coupling being inoperative upon said parting if said coupler has been disconnected, substantially as described.

2. The combination with a car, of brakes thereon, a second car, a hose-coupling between said cars and means whereby the draft upon said coupling operates to apply said brakes, substantially as described.

3. The combination with a car, of braking means mounted thereon, a second car, a draft-coupling between said cars, and a hose-coupling between said cars, including means whereby said brakes are applied upon a draft between said cars when said draft-coupler is disconnected and said hose-coupling has not been disconnected, said braking means remaining inoperative if the hose-coupler has been disconnected, substantially as described.

4. The combination with a car, of braking means mounted thereon, a second car, a draft-coupling between said cars, a hose-coupling between said cars, means whereby said brakes are applied upon a draft between said cars when said draft-coupler is disconnected and when said hose-coupling has not been disconnected, said braking means remaining inoperative if said hose-coupler has been disconnected, and common means for disconnecting said couplings, substantially as described.

5. The combination with a car, of a longitudinally-movable coupler-section thereon, and means for adjusting the longitudinal position of said coupler-section, substantially as described.

6. The combination with a car, of an adjustable bracket supported thereon, and a coupler-section spring supported at a plurality of longitudinally-displaced points by said bracket, substantially as described.

7. The combination with a car, of an adjustable bracket supported thereby, and a coupler-section pivoted to said bracket and spring-supported at a plurality of longitudinally-displaced points, substantially as described.

8. In a hose-coupler having two sections, the combination with a pin secured to each section, means in each section for latching the pin of the other section, and common means for releasing both of said pins from said latching means, substantially as described.

9. In a hose-coupler section, the combination with a pin, of a latch for securing a pin from the opposing section of the coupler, means for moving said latch, and means operatively related to said means for turning said pin, substantially as described.

10. In a hose-coupler the combination with a pin projecting from one section, of a latch in the other section adapted to secure said pin against pull, and means operated by the draft upon the coupler for releasing said pin, substantially as described.

11. In a hose-coupler, the combination with a pin projecting from one section, of means the other section for securing said pin, camming means whereby draft upon said pin operates to turn and thereby release said pin, and a spring tending to force said pin in the opposite direction, substantially as described.

12. The combination with a car, of a train-pipe thereon for controlling the brakes, a valve controlling said train-pipe, a coupler-section comprising a projecting pin at one side of the passage through said coupler-section and means whereby said pin controls said valve, substantially as described.

13. The combination with a car provided with fluid-pressure brake devices, of a coupler-section connected with the car and having formed therein a passage extending from a pressure-duct of the brake mechanism through one face of said coupler-section, a valve arranged within and adapted to normally close said passage and provided with a projecting pin or stud, and means for automatically applying pressure to the pin of the corresponding valve of a similar coupler-section when said sections are accidentally disengaged substantially as and for the purpose described.

14. The combination with a car provided with fluid-pressure brake devices, of a coupler-section mounted on the car and provided with ducts communicating with the pressure-ducts of the brake devices, valves arranged within said ducts of the coupler-section and adapted to be automatically opened when said section is engaged by a similar section, said coupler-section having a passage adapted to connect one of the pressure-ducts therein with the atmosphere, and a valve controlling said passage and adapted to be operated from the exterior of the coupler, substantially as and for the purpose described.

15. The combination with two cars each provided with fluid-pressure brake devices, of a coupling between said cars comprising a section mounted on each car and provided with ducts adapted to form part of the brake devices, means for automatically connecting the ducts of one section of the coupler with the corresponding ducts in the other coupler-section as said sections are engaged, each of said coupler-sections having a passage adapted to connect one of said pressure-ducts with the atmosphere, a valve controlling each of said passages, and means for automatically actuating said valve when the coupler-sections are unintentionally disengaged, substantially as and for the purpose described.

16. The combination with a car provided with fluid-pressure brake devices, of a coupler-section having therein ducts forming part of the brake devices, and provided with a passage adapted to connect one of said ducts with the atmosphere, a valve controlling said passage, and means on the coupler-section for engaging a similar section on another car, said means being adapted to automatically actuate said valve when unintentionally disengaged from said second coupler-section, substantially as and for the purpose described.

17. The combination with a car, of a brake train-pipe thereon, a valve controlling said train-pipe, a coupler-section comprising a projecting pin, means whereby the draft upon said coupler-section operates to release said pin and means whereby the draft upon said pin operates to actuate said valve, substantially as described.

18. The combination with a car, of brakes thereon, a second car, a hose-coupler between said cars comprising sections adapted to be connected together and means whereby draft on said coupler operates to disconnect said sections and apply said brakes, substantially as described.

19. In a hose-coupler, the combination with means for accomplishing the connection and disconnection of said coupler, of a drip-valve operatively related to each section of said coupler, springs acting to hold said valves closed, and means for positively opening said valves when the coupler-sections are disconnected, substantially as described.

20. In a hose-coupler having two sections, the combination with a drip-valve on one section, of a drip-valve on the other section, said valves being so constructed and located in said sections that when said sections are in connected position said valves mutually operate to close each other, substantially as described.

21. In a hose-coupler section, the combination with a central portion having a duct, of a pin upon one side of said portion, a pin-engaging latch upon the other side of said portion, means for moving said latch into unlatched position, means for moving said pin into unlatched position, said means being operatively connected together, substantially as described.

22. In a hose-coupler section, the combination with a pin, of a latch for securing a pin from the opposing section of the coupler, means for moving said latch, and means operatively related to said means for moving said pin, substantially as described.

23. In a hose-coupler section, the combination with a central body portion having a duct, of a spring-latch mounted to turn upon said body portion, a pin, and gearing connecting said pin and latch, substantially as described.

24. In a hose-coupler section, the combination with a central body portion having a duct, of a funnel upon one side of said body portion, a spring-latch behind said funnel, a gear connected to said latch and rotatably mounted upon said body portion, a pin on the opposite side of said body portion from said funnel, and a gear engaging with said pin and the aforesaid gear, substantially as described.

25. The combination with a car, of a coupler-section, spring suspended therefrom at a pivotal point and also spring-supported at a plurality of points longitudinally displaced from said pivot, substantially as described.

26. The combination with two cars having fluid-operated brakes, of a separable coupling for connecting the brake mechanism of one car with that of the other, and including means whereby the brakes on both cars will be operated upon the parting of said cars when said coupling has not been disconnected, such brake-controlling means of the coupling being inoperative if the coupler has been disconnected.

In testimony whereof I have signed my name to this specification in the presence of two subscribing witnesses.

GEORGE E. KELLY.

Witnesses:
 W. L. RAEDER,
 M. C. BARRETT.